United States Patent
Komori et al.

(10) Patent No.: US 8,613,553 B2
(45) Date of Patent: Dec. 24, 2013

(54) PRODUCTION METHOD OF FLUID DYNAMIC BEARING, FLUID DYNAMIC BEARING, SPINDLE MOTOR, AND DISK DRIVING APPARATUS

(75) Inventors: Manabu Komori, Kyoto (JP); Mitsuya Kusuhara, Kyoto (JP); Kunio Sakurada, Kyoto (JP); Kazuya Sato, Kyoto (JP)

(73) Assignee: Nidec Corporation, Kyoto (JP)

( * ) Notice: Subject to any disclaimer, the term of this patent is extended or adjusted under 35 U.S.C. 154(b) by 613 days.

(21) Appl. No.: 12/839,568

(22) Filed: Jul. 20, 2010

(65) Prior Publication Data

US 2011/0026163 A1   Feb. 3, 2011

(30) Foreign Application Priority Data

Jul. 30, 2009 (JP) ................................. 2009-177682

(51) Int. Cl.
*F16C 32/06* (2006.01)

(52) U.S. Cl.
USPC ......................................................... 384/107

(58) Field of Classification Search
USPC ................... 384/100, 107, 112, 114, 120
See application file for complete search history.

(56) References Cited

U.S. PATENT DOCUMENTS

| | | | |
|---|---|---|---|
| 5,366,298 A | 11/1994 | Toshimitsu et al. | |
| 6,339,270 B1 | 1/2002 | Ichiyama | |
| 6,361,214 B1 * | 3/2002 | Ichiyama ....................... | 384/107 |
| 6,447,167 B1 * | 9/2002 | Kashiwada et al. ........... | 384/100 |
| 6,846,109 B2 * | 1/2005 | Yoshimura et al. ............ | 384/279 |
| 7,008,109 B2 * | 3/2006 | Gomyo et al. ................. | 384/100 |
| 7,461,455 B2 | 12/2008 | Gomyo et al. | |
| 8,215,842 B2 * | 7/2012 | Maruyama et al. ............ | 384/100 |
| 2001/0000073 A1 * | 3/2001 | Kobayashi et al. ............ | 384/100 |
| 2003/0048575 A1 | 3/2003 | Nishimura et al. | |
| 2004/0076350 A1 | 4/2004 | Gomyo et al. | |
| 2004/0104634 A1 | 6/2004 | Nishimura et al. | |
| 2005/0225187 A1 | 10/2005 | Hafen et al. | |
| 2007/0223848 A1 | 9/2007 | Winterhalter | |
| 2007/0236091 A1 | 10/2007 | Fukushima | |

FOREIGN PATENT DOCUMENTS

| | | |
|---|---|---|
| JP | 2001-289243 A | 10/2001 |
| JP | 2002-256280 | 9/2002 |
| JP | 2003-088042 | 3/2003 |
| JP | 2004-181396 | 7/2004 |
| JP | 2004-282810 | 10/2004 |
| JP | 2006-211795 | 8/2006 |
| JP | 2008-215545 A | 9/2008 |
| JP | 2009-041671 | 2/2009 |

OTHER PUBLICATIONS

Maruyama et al., "Dynamic Fluid Pressure Bearing, Spindle Motor, Disk Drive Apparatus and Method for Manufacturing the Dynamic Fluid Pressure Bearing," U.S. Appl. No. 12/362,576, filed Jan. 30, 2009.

* cited by examiner

*Primary Examiner* — James Pilkington
(74) *Attorney, Agent, or Firm* — Keating & Bennett, LLP

(57) ABSTRACT

A fluid dynamic bearing includes: a shaft arranged along a center axis; an annular portion expanding radially outwards from the shaft; a sleeve having a top surface opposed to an under surface of the annular portion to support the shaft and the annular portion in a relatively rotatable manner; and a lubricating fluid interposed between the shaft and annular portion and the sleeve. The fluid dynamic bearing further includes a substantially annular edge surrounding the center axis on the under surface and a solid lubricating film on the radially outer side of the edge.

6 Claims, 16 Drawing Sheets

PRODUCTION METHOD OF FLUID DYNAMIC BEARING, FLUID DYNAMIC BEARING, SPINDLE MOTOR, AND DISK DRIVING APPARATUS

BACKGROUND OF THE INVENTION

1. Field of the Invention

The present invention relates to a production method of a fluid dynamic bearing, a fluid dynamic bearing, a spindle motor, and a disk driving apparatus.

2. Description of the Related Art

A hard disk drive or an optical disk drive is provided with a spindle motor to rotate a disk around a center axis thereof. The spindle motor relatively rotates a stationary portion and a rotating portion via a bearing. In recent years, a fluid dynamic bearing is often used as a bearing for the spindle motor. In the fluid dynamic bearing, lubricating fluid is interposed between a shaft and a sleeve, so as to relatively rotate the shaft and the sleeve by means of dynamic pressure in the lubricating fluid.

The construction of such a fluid dynamic bearing is described in Japanese Laid-Open Patent Publication No. 2003-88042, for example.

In a conventional fluid dynamic bearing, an annular rotor hub extending in a radial direction is fixed to an upper portion of a shaft. On the other hand, a bottom surface of a rotor hub is opposed to a top surface of the sleeve via the lubricating fluid. In order to increase the sliding property between the rotor hub and the sleeve, or in order to suppress the damage due to the contact between the rotor hub and the sleeve, a film with high lubricating property is sometimes formed on the bottom surface of the rotor hub, or the like.

The film is generally formed in such a manner that a liquid for forming the film is applied and spread, and then the solvent is dehydrated. However, if the film is formed beyond the range to be coated with the film, the film may disadvantageously be in contact with another member on the outside of the desired range. This possibly causes the rotational characteristics of the motor to significantly deteriorate, or causes device defect to occur. For this reason, a technique for forming the film only in a required range is desired.

SUMMARY OF THE INVENTION

According to a first exemplary aspect of the present invention, the production method of a fluid dynamic bearing including: a shaft arranged along a center axis; an annular portion expanding radially outwards from the shaft; a sleeve having a top surface opposed to an under surface of the annular portion, for supporting the shaft and the annular portion in a relatively rotatable manner; and a lubricating fluid interposed between the shaft and annular portion and the sleeve, includes the steps of: (a) preparing the annular portion having a substantially annular edge surrounding the center axis on the under surface; (b) applying a forming liquid for forming a solid lubricating film on the radially outer side of the edge of the under surface; and (c) evaporating a solvent of the forming liquid.

According to a second exemplary aspect of the present invention, the production method of a fluid dynamic bearing including: a shaft arranged along a center axis; an annular portion expanding radially outwards from the shaft; a sleeve having a top surface opposed to an under surface of the annular portion, for supporting the shaft and the annular portion in a relatively rotatable manner; and a lubricating fluid interposed between the shaft and annular portion and the sleeve, includes the steps of: (e) preparing the sleeve having a substantially annular edge surrounding the center axis on the top surface; (f) applying a forming liquid for forming a solid lubricating film on the radially outer side of the edge of the top surface; and (g) evaporating a solvent of the forming liquid.

According to the first and second exemplary aspects of the present invention, when the solid lubricating film is formed, due to the surface tension in the substantially annular edge, it is possible to prevent the forming liquid from flowing into the inside of the edge. Therefore, the solid lubricating film can be formed in the required range.

According to a third exemplary aspect of the present invention, the fluid dynamic bearing includes: a shaft arranged along a center axis extending vertically; an annular portion expanding radially outwards from the shaft; a sleeve having a top surface opposed to an under surface of the annular portion, for supporting the shaft and the annular portion in a relatively rotatable manner; and a lubricating fluid interposed between the shaft and annular portion and the sleeve, wherein the under surface has a substantially annular edge surrounding the center axis, and a region of the under surface on the radially outer side than the edge is covered with a solid lubricating film.

According to the fourth exemplary aspect of the present invention, the fluid dynamic bearing includes: a shaft arranged along a center axis extending vertically; an annular portion expanding radially outwards from the shaft; a sleeve having a top surface opposed to an under surface of the annular portion, for supporting the shaft and the annular portion in a relatively rotatable manner; and a lubricating fluid interposed between the shaft and annular portion and the sleeve, wherein the top surface has a substantially annular edge surrounding the center axis, and a region of the top surface on the radially outer side than the edge is covered with a solid lubricating film.

According to the third and fourth exemplary aspects of the present invention, since the edge is provided on a surface of a member on which the solid lubricating film is formed, it is difficult for the solid lubricating film to be formed on the inside of the edge. Therefore, the solid lubricating film can be formed in a required region, and the occurrence of device defect can be reduced.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
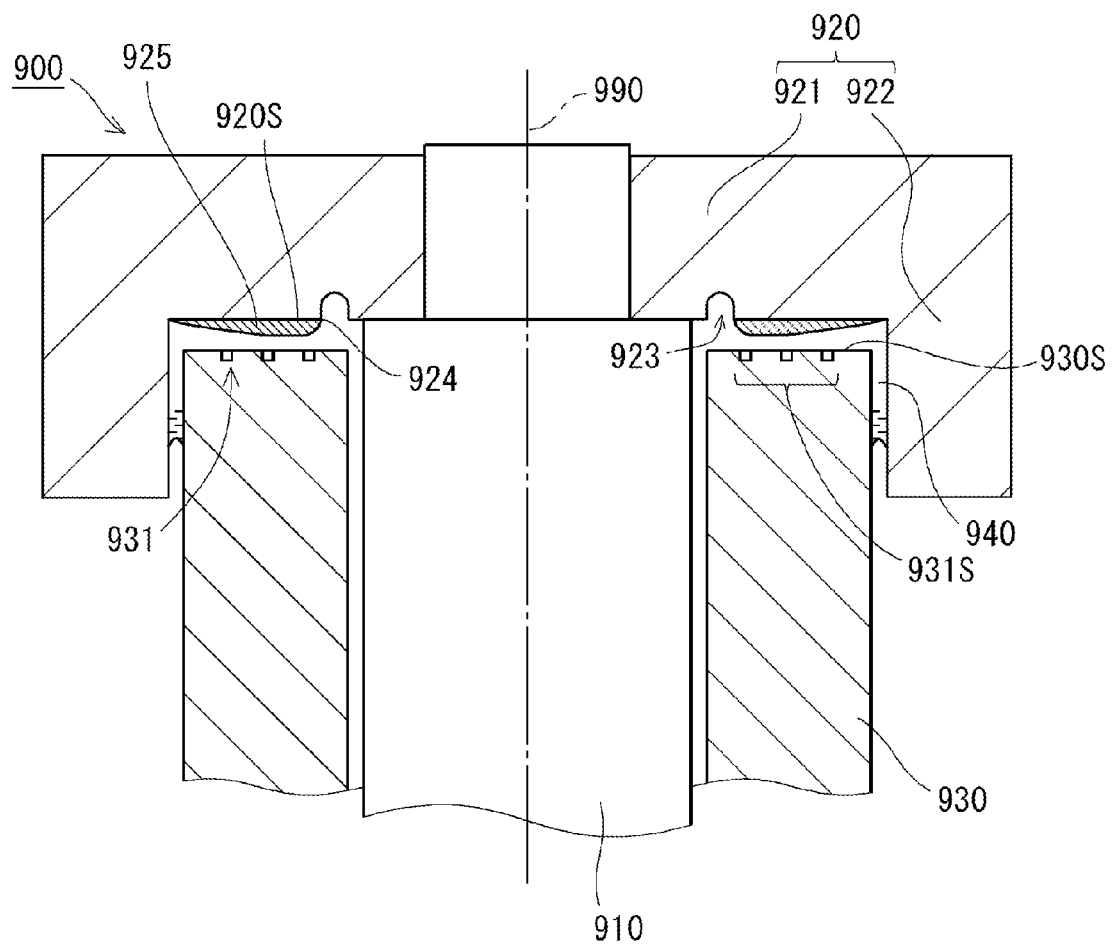
FIG. 1 is a sectional view taken along a plane including a center axis of a fluid dynamic bearing according to a preferred embodiment of the present invention.

Referring to FIGS. 1 through 15, preferred embodiments of the present invention will be described in detail. In the explanation of preferred embodiments of the present invention, a direction along a center axis 990 and a center axis 9 is indicated as a vertical (up/down) direction, and a position on the side of annular portions 920 and 920a or a bushing 44 with respect to sleeves 930, 930a, and 34 is defined as the upper side. It should be noted that the up/down direction is defined only for the sake of simplicity, so that the direction does not define the installation posture of the fluid dynamic bearing or the disk driving apparatus when the bearing or the apparatus is assembled into an actual device.

Figure 2:
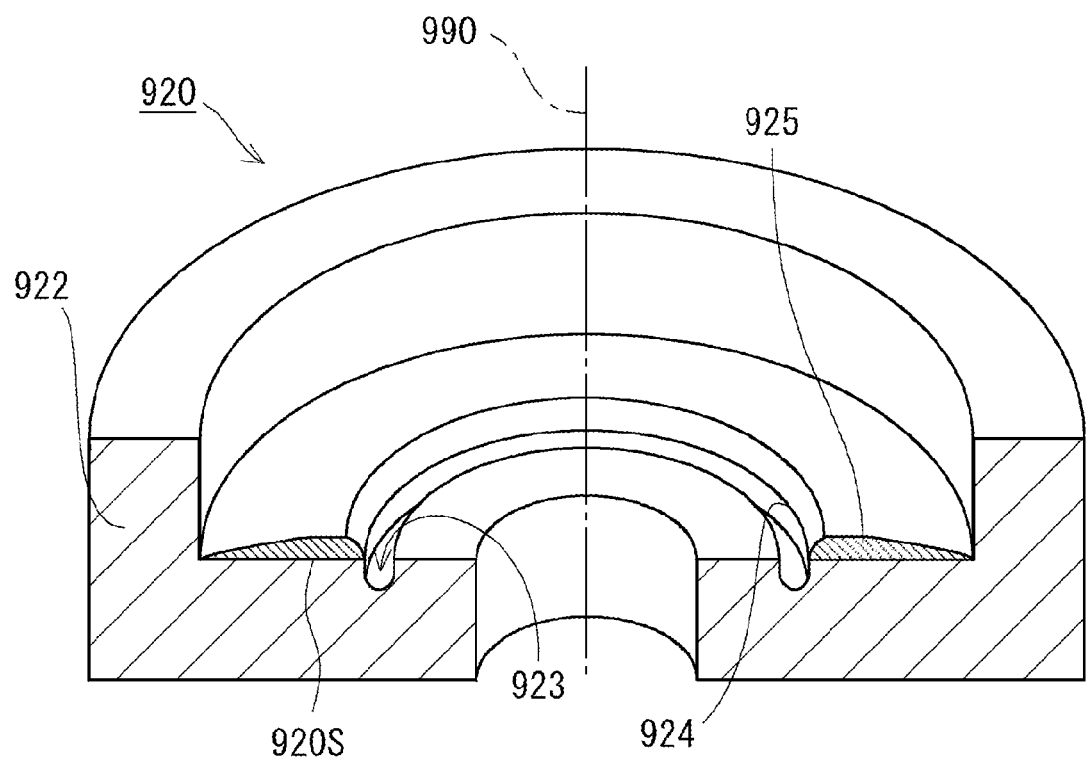
FIG. 2 is a perspective view taken along a plane including a center axis of an annular portion.

FIG. 1 is a sectional view taken along a plane including a center axis of a fluid dynamic bearing 900 according to a preferred embodiment of the present invention. FIG. 2 is a perspective view taken along a plane including a center axis of an annular portion 920. The fluid dynamic bearing 900 includes a shaft 910, the annular portion 920, a sleeve 930, and a lubricating fluid 940.

The shaft 910 is arranged along a center axis 990 extending in the vertical (up/down) direction. In an upper portion of the shaft 910, the annular portion 920 extending outwards in a radial direction is provided. The radial direction indicates a direction substantially perpendicular to the center axis 990. The annular portion 920 includes a flat plate portion 921 extending in the radial direction, and a circular ring portion 922 extending downwards from an outer periphery of the flat plate portion 921.

The sleeve 930 has a hole into which the shaft 910 is inserted. The sleeve 930 is preferably formed to be substantially cylindrical. A top surface 930S of the sleeve 930 is opposed to a bottom surface 920S of the flat plate portion 921 of the annular portion 920. A gap between the sleeve 930 and the shaft 910, and a gap between the sleeve 930 and the annular portion 920 are continuously filled with the lubricating fluid 940. The fluid level of the lubricating fluid 940 is positioned between the circular ring portion 922 and the sleeve 930.

As shown in FIG. 2, on the bottom surface 920S of the annular portion 920, an annular groove 923 which is substantially annular is disposed so as to surround the center axis 990. On the bottom surface 920S of the annular portion 920, an edge 924 which extends annularly is configured by a salient angle portion of the annular groove 923. In the bottom surface 920S, in an area on the outer side in the radial direction than the edge 924, a solid lubricating film 925 is formed in order to increase the sliding property between the annular portion 920 and the sleeve 930.

As shown in FIG. 1, on the top surface 930S of the sleeve 930, thrust dynamic pressure grooves 931 for inducing fluid dynamic pressure in the lubricating fluid 940. The thrust dynamic pressure grooves 931 are constituted by a plurality of helical grooves with the central focus on the center axis 990. The shaft 910 and the annular portion 920 are lifted by the dynamic pressure induced in the lubricating fluid 940 by means of the thrust dynamic pressure grooves 931 during the rotation. The area in which the thrust dynamic pressure grooves 931 are disposed includes a bearing surface 931S with respect to the thrust direction.

In a production process of such a fluid dynamic bearing 900, first, the annular portion 920 having the substantially annular edge 924 is prepared in the bottom surface 920S. Then, a forming liquid for forming a solid lubricating film 925 is supplied to a portion of the bottom surface 920S on the outer side in the radial direction than the edge 924. In this condition, the annular portion 920 is rotated around the center axis 990, thereby spreading the forming liquid on the bottom surface 920S. Then, the solvent of the forming liquid is appropriately evaporated, thereby forming the solid lubricating film 925 on the annular portion 920. The forming liquid is constituted by a solid material such as a resin with high lubricating property and a solvent. The solid lubricating film indicates a solid after a liquid solution is evaporated. In the fluid dynamic bearing 900 according to this preferred embodiment, when the solid lubricating film 925 is formed, it is difficult to cause the forming liquid to flow onto the inner side than the edge 924 due to the action of the surface tension of the substantially annular edge 924, so that the formation of the solid lubricating film 925 in a portion of the bottom surface 920S on the radially inner side than the edge 924 can be suppressed. Accordingly, the solid lubricating film 925 can be formed in a required area of the bottom surface 920S. Since the solid lubricating film 925 can be formed in an appropriate position, it is possible to adequately prevent the damage due to the contact of the solid lubricating film 925 with another member (the sleeve 930, herein) from occurring. Thus, the occurrence of device defect can be reduced.

Figure 3:
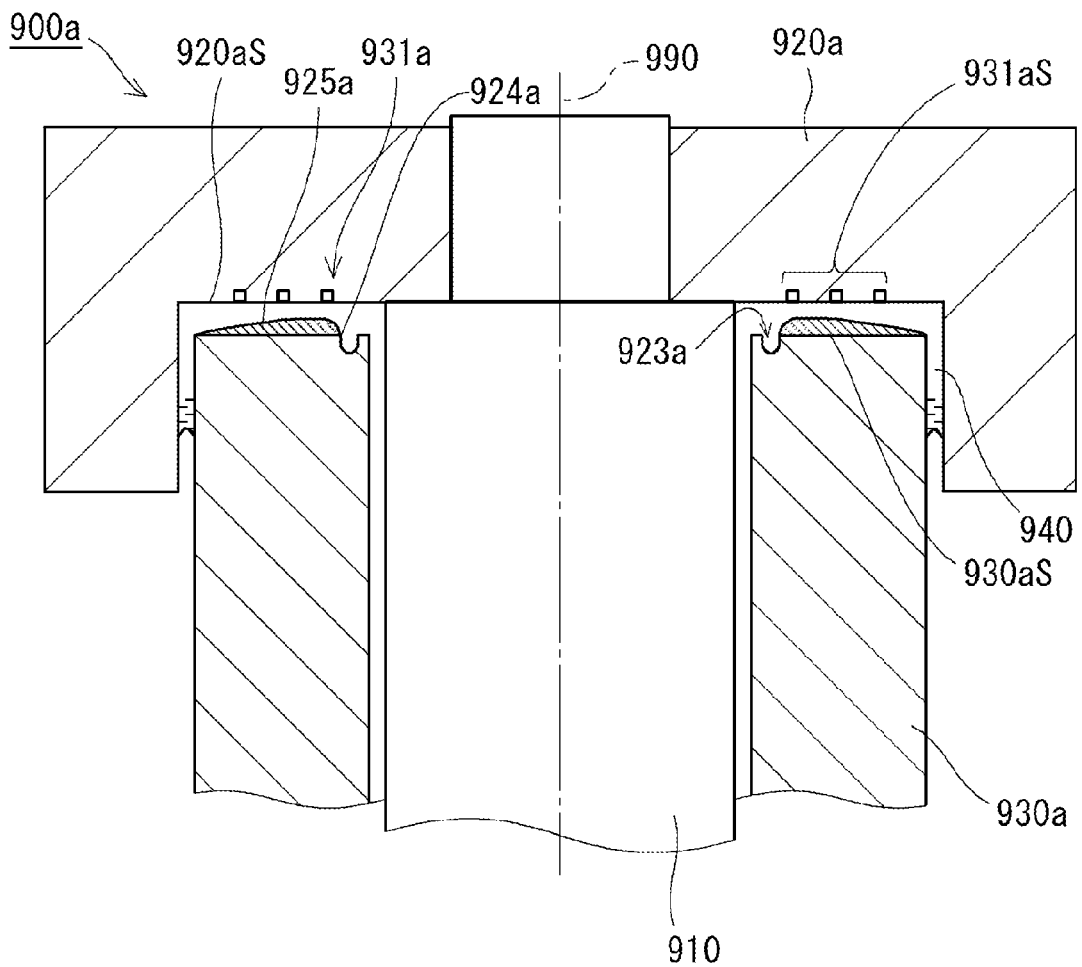
FIG. 3 is a sectional view taken along a plane including a center axis of a fluid dynamic bearing according to another preferred embodiment of the present invention.

FIG. 3 is a sectional view taken along a plane including a center axis of a fluid dynamic bearing 900a in another preferred embodiment of the present invention. In the fluid dynamic bearing 900a, a bottom surface 920aS of an annular portion 920a includes a bearing surface 931a on which thrust dynamic pressure grooves 931a are arranged.

On a top surface 930aS of a sleeve 930a, an annular groove 923a is disposed so as to surround a center axis 990. A salient angle of the annular groove 923a on the outside in the radial direction constitutes an edge 924a extending substantially annularly. A region of the top surface 930aS on the outer side in the radial direction than the annular groove 923a is covered with a solid lubricating film 925a.

In a production process of such a fluid dynamic bearing 900a, a sleeve 930a having a substantially annular edge 924a on its top surface 930aS is first prepared. Then, on the radially outer side than the edge 924a of the top surface 930aS, a forming liquid for forming a solid lubricating film is supplied. Thereafter, the sleeve 930a is rotated around the center axis 990 at a predetermined speed of rotation, so that the forming liquid is spread on the top surface 930aS. Then, the solvent of the forming liquid is appropriately evaporated, thereby obtaining the sleeve 930a with the solid lubricating film 925a.

In the fluid dynamic bearing 900a of this preferred embodiment, when the solid lubricating film 925a is formed, due to the action of the surface tension in the substantially annular edge 924a arranged in the sleeve 930a, it is difficult for the forming liquid to flow into the inside of the edge 924a. Accordingly, it is possible to prevent the solid lubricating film 925a from being formed on the radially inner side than the edge 924a.

Figure 4:
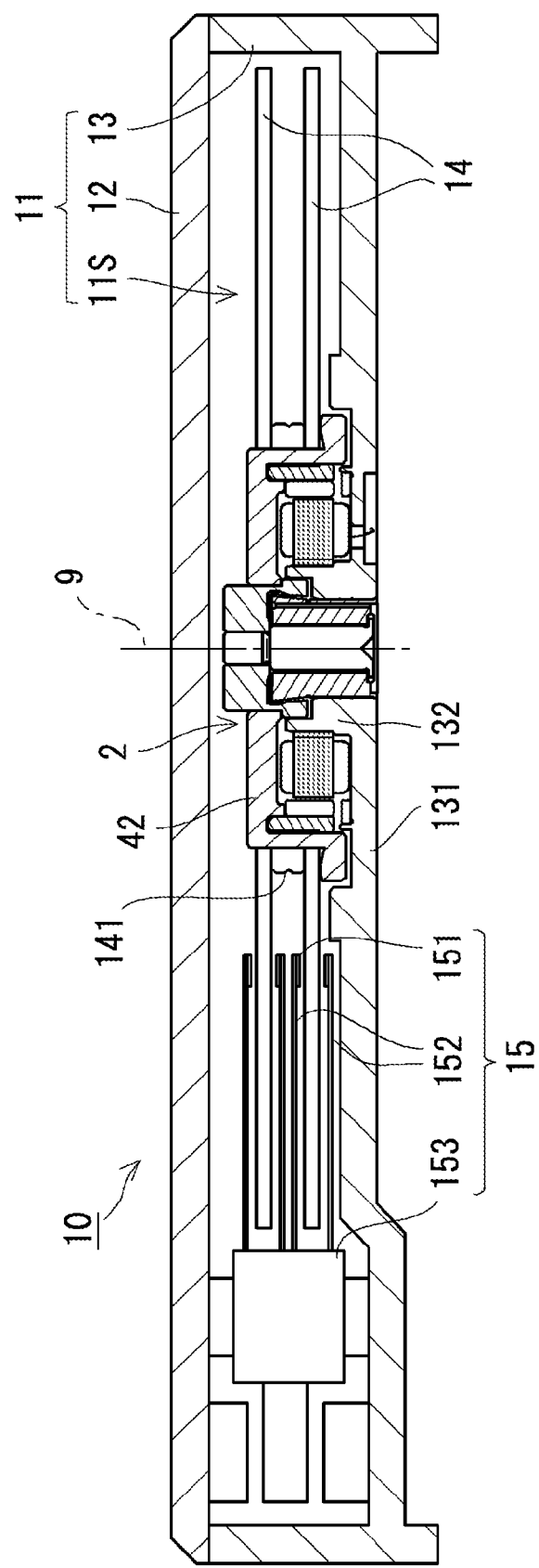
FIG. 4 is a sectional view taken along a plane including a center axis of a disk driving apparatus.

FIG. 4 is a sectional view taken along a plane including the center axis of the disk driving apparatus 10. The disk driving apparatus 10 includes a housing 11, a disk 14, an access unit 15, and a spindle motor 2. The disk driving apparatus 10 rotates a magnetic disk 14 (hereinafter, it is referred to as a disk 14), thereby performing the reading/writing of information from/to the disk 14.

The housing 11 includes a plate-like cover member 12 and a cup-like base member 13 in which an upper portion is opened. The cover member 12 is fixed to the upper portion of the base member 13, so as to close the opening of the upper portion of the base member 13. The housing 11 accommodates the disk 14, the access unit 15, and the spindle motor 2 in an interior space 11S formed by the cover member 12 and the base member 13.

The base member 13 has a flat plate portion 131 having an opening on the inside thereof, and a cylindrical holder portion 132 which protrudes upwards from an inner peripheral portion of the above-mentioned opening. On an inner bottom portion of the base member 13, the access unit 15 and the spindle motor 2 are disposed. The base member 13 is formed by a metal such as aluminum alloy, for example.

Two disks 14 and 14 are disk-shaped information recording media each having a hole in a center portion thereof. The disks 14 and 14 are mounted on a hub 42 of the spindle motor 2, and placed one above the other via a spacer 141.

The access unit 15 includes a plurality of heads 151 arranged in accordance with the upper surface and the lower surface of each disk 14, an arm 152 for supporting each head 151, and an oscillating mechanism 153 for oscillating the arm 152. In FIG. 4, four heads 151 are shown. However, the number is not limited to four, but a plurality of heads such as three heads and the like can be provided.

The access unit 15 causes the arm 152 to oscillate along the disk 14 by means of the oscillating mechanism 153, thereby accessing the head 151 to a specific position of the disk 14. Accordingly, the access unit 15 performs the reading/writing of information from/to a recording face of the respective rotating disk 14. It will be appreciated that the access unit 15 may perform only one of the reading and the writing of the information from and to the disk 14.

Figure 5:
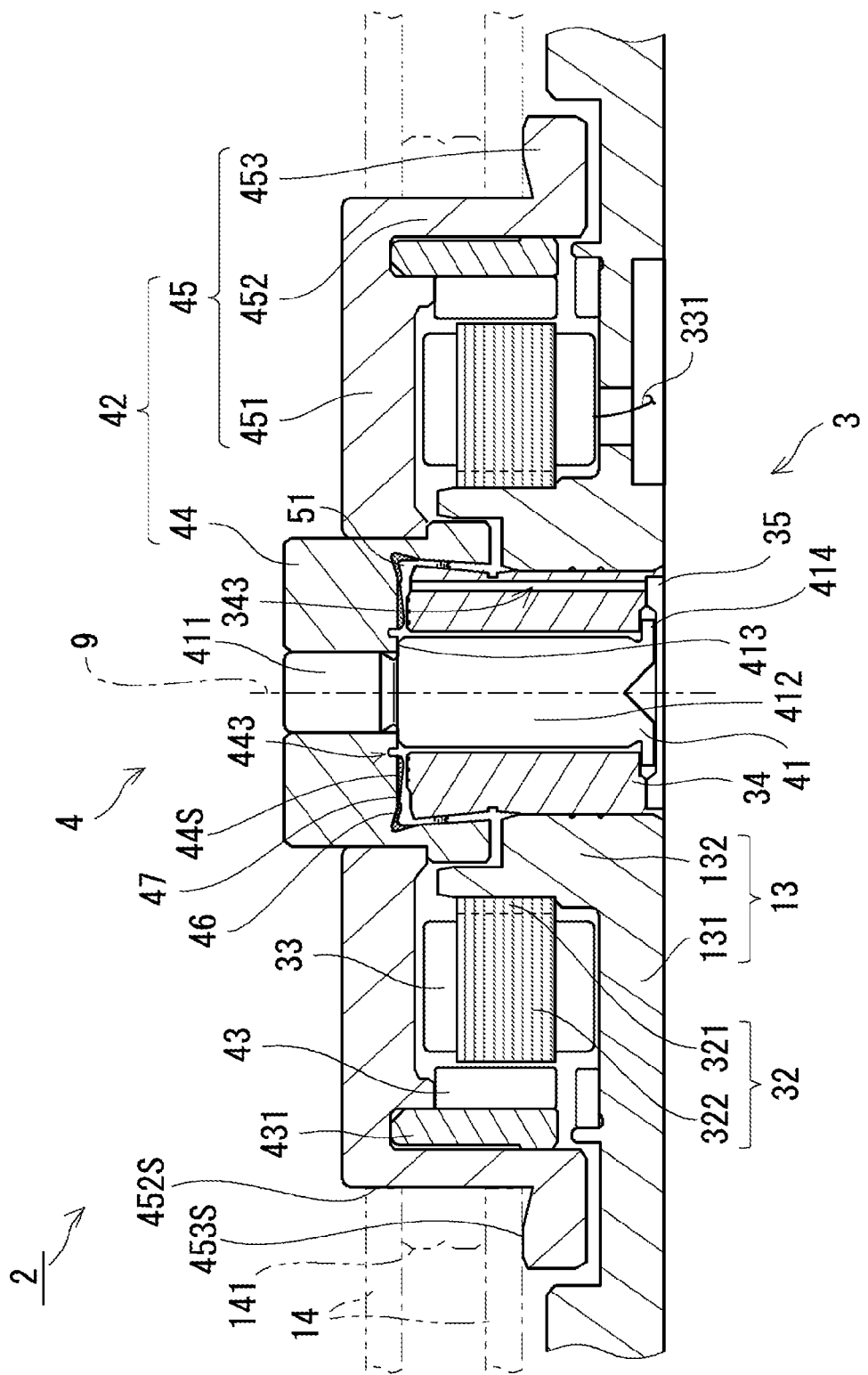
FIG. 5 is a sectional view taken along a plane including a center axis of a spindle motor.

FIG. 5 is a sectional view taken along a plane including the center axis of the spindle motor 2. The spindle motor 2 includes a stationary portion 3 fixed to the housing 11, and a rotating portion 4 which rotates around the center axis 9 with the disk 14 mounted. The stationary portion 3 has a stator core 32, a coil 33, and a sleeve 34. The rotating portion 4 has a shaft 41, a hub 42, and a rotor magnet 43.

A holder portion 132 has a through hole for holding the sleeve 34 on the inner circumferential side (i.e., on the inner circumferential side with respect to the center axis 9). On a face of the holder portion 132 on the outer circumferential side (i.e., on the outer circumferential side with respect to the center axis 9), the stator core 32 is disposed.

The stator core 32 has a circular ring shaped core back 321 fixed to the holder portion 132, and a plurality of teeth portions protruding from the core back 321 onto the outer circumferential side in the radial direction.

The coil 33 is constituted by a conductive wire wound around each of the teeth portions 322. The coil 33 is connected to a predetermined power supply which is not shown. When a driving current is supplied from the power supply to the coil 33, a magnetic flux in the radial direction is generated in the teeth portions 322.

The sleeve 34 has a substantially cylindrical shape, and is located so as to surround the shaft 41. The sleeve 34 is fixed to an inner circumferential face of the holder portion 132.

The sleeve 34 is formed by a metal material such as a magnetic or nonmagnetic stainless steel, or a copper alloy, for example. A micro gap between an inner circumferential face of the sleeve 34 and an outer circumferential face 41 of the shaft, a micro gap between a bottom surface of the shaft 41 and a cap 35, a micro gap between a top surface of the sleeve 34 and the hub 42, and a communicating hole 343 passing through the sleeve 34 from the top surface to the bottom surface in the axial direction are filled with a lubricating fluid 51. As the lubricating fluid 51, an oil including ester such as polyol esters oil and diesters oil is used, for example.

Figure 6:
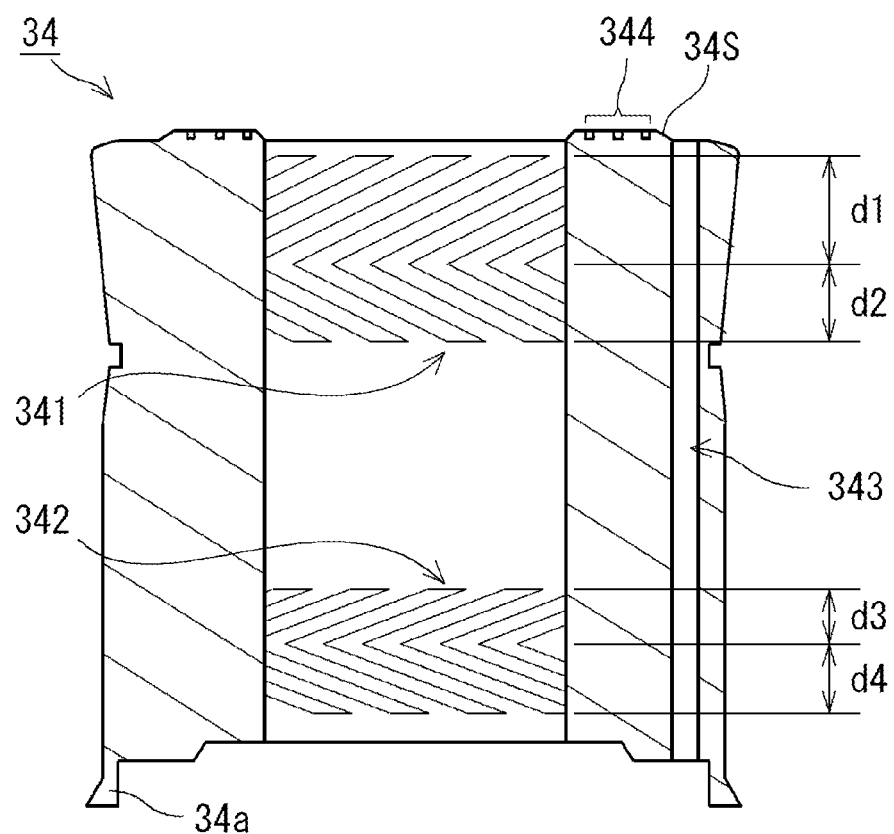
FIG. 6 is a sectional view taken along a plane including a center axis of a sleeve.

FIG. 6 is a sectional view taken along a plane including the center axis of the sleeve 34. In an upper portion and a lower portion of the inner circumferential surface of the sleeve 34, first radial dynamic pressure grooves 341 and second radial dynamic pressure grooves 342 are arranged, respectively, for inducing dynamic pressure in the lubricating fluid 51 existing between the outer circumferential surface of the shaft 41 and the inner circumferential surface of the sleeve 34. These dynamic pressure grooves are so-called herringbone grooves in which a plurality of V-shaped grooves are arranged in the circumferential direction. A radial dynamic bearing mechanism is constituted by the outer circumferential surface of the shaft 41, the first radial dynamic pressure grooves 341 and the second radial dynamic pressure grooves 342 which are opposed to the outer circumferential surface of the shaft 41, and the lubricating fluid 51.

When the shaft 41 is rotated with respect to the sleeve 34, the shaft 41 is supported in the radial direction by the dynamic pressure induced in the lubricating fluid 51. In this preferred embodiment, the first radial dynamic pressure grooves 341 and the second radial dynamic pressure grooves 342 are arranged on the inner circumferential surface of the sleeve. It is sufficient that they may be arranged on either one of the inner circumferential surface of the sleeve 34 or the outer circumferential surface of the shaft 41.

Figure 7:
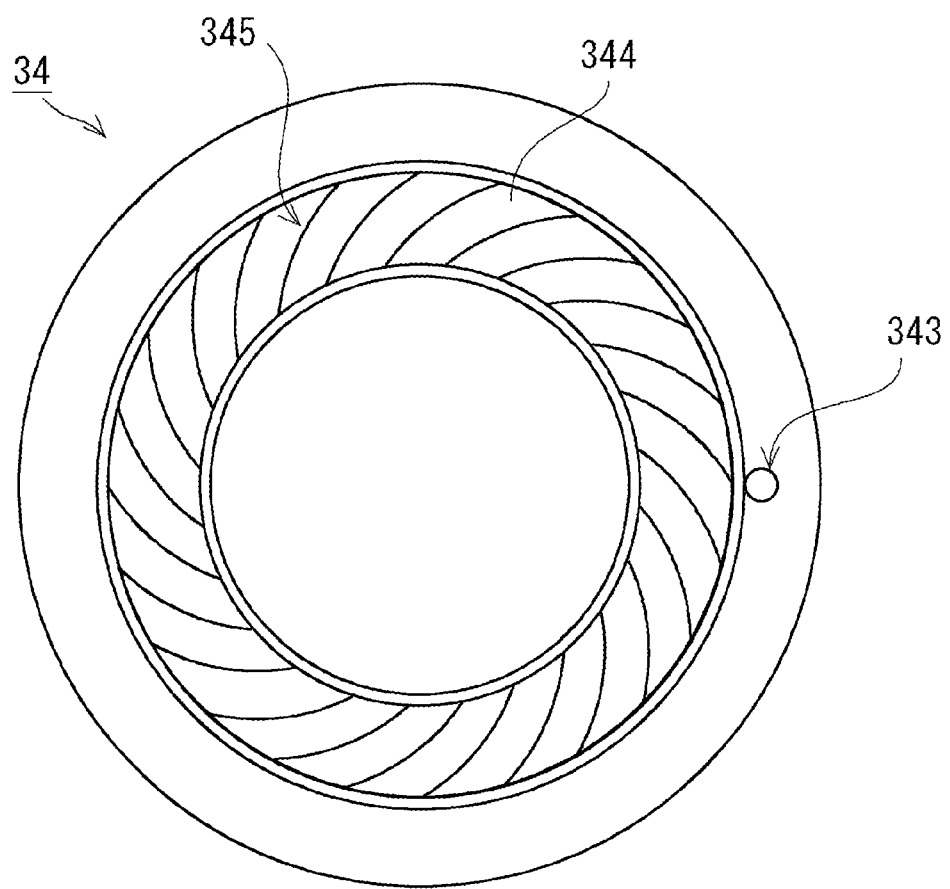
FIG. 7 is a top plan view of the sleeve.

FIG. 7 is a top plan view of the sleeve 34. On the inside of a top surface 34S of the sleeve 34, a bearing face 344 raised so as to come closer to an under surface 44S of a bushing 44 which will be described later is disposed. On the bearing face 344, thrust dynamic pressure grooves 345 are arranged. The thrust dynamic pressure grooves 345 induce dynamic pressure in the lubricating fluid 51 existing between the under surface 44S of the bushing 44 and the top surface 34S of the sleeve 34. The thrust dynamic pressure grooves 345 are constituted by a plurality of helical grooves with the central focus on the center axis 9.

When the shaft 41 is rotated with respect to the sleeve 34, the lubricating fluid 51 is pressurized by the thrust dynamic pressure grooves 345. As described above, by the dynamic pressure induced in the lubricating fluid 51, the shaft 41 and the hub 42 are axially supported and rotated.

Referring back to FIG. 5, the shaft 41 is arranged along the center axis 9. The shaft 41 is preferably formed so as to have a substantially columnar shape. The shaft 41 is supported in a relatively rotatable manner to the sleeve 34 in the condition that the shaft 41 is disposed on the inside of the sleeve 34 (i.e., in a bearing hole). The shaft 41 has a head portion 411 with a relatively smaller diameter and a body portion 412 with a relatively larger diameter. On an outer circumferential surface of the head portion 411, the bushing 44 which will be described later is fixed. The body portion 412 is disposed on the inside of the sleeve 34.

In a boundary portion between the head portion 411 and the body portion 412, the body portion 412 protrudes in the radial direction. A top surface of the protruding portion of the body portion 412 constitutes a stepped face 413. The stepped face 413 comes into contact with an inner face portion of the under surface 44S of the bushing 44, thereby positioning the hub 42 with respect to the shaft 41.

The hub 42 is fixed to the shaft 41, so that the hub 42 is rotated together with the shaft 41. The hub 42 is fixed to the outer circumferential surface of the bushing 44 which is fixed to the head portion 411 of the shaft 41. The hub 42 includes a disk holding portion 45 for holding two disks 14 and 14.

Figure 8:
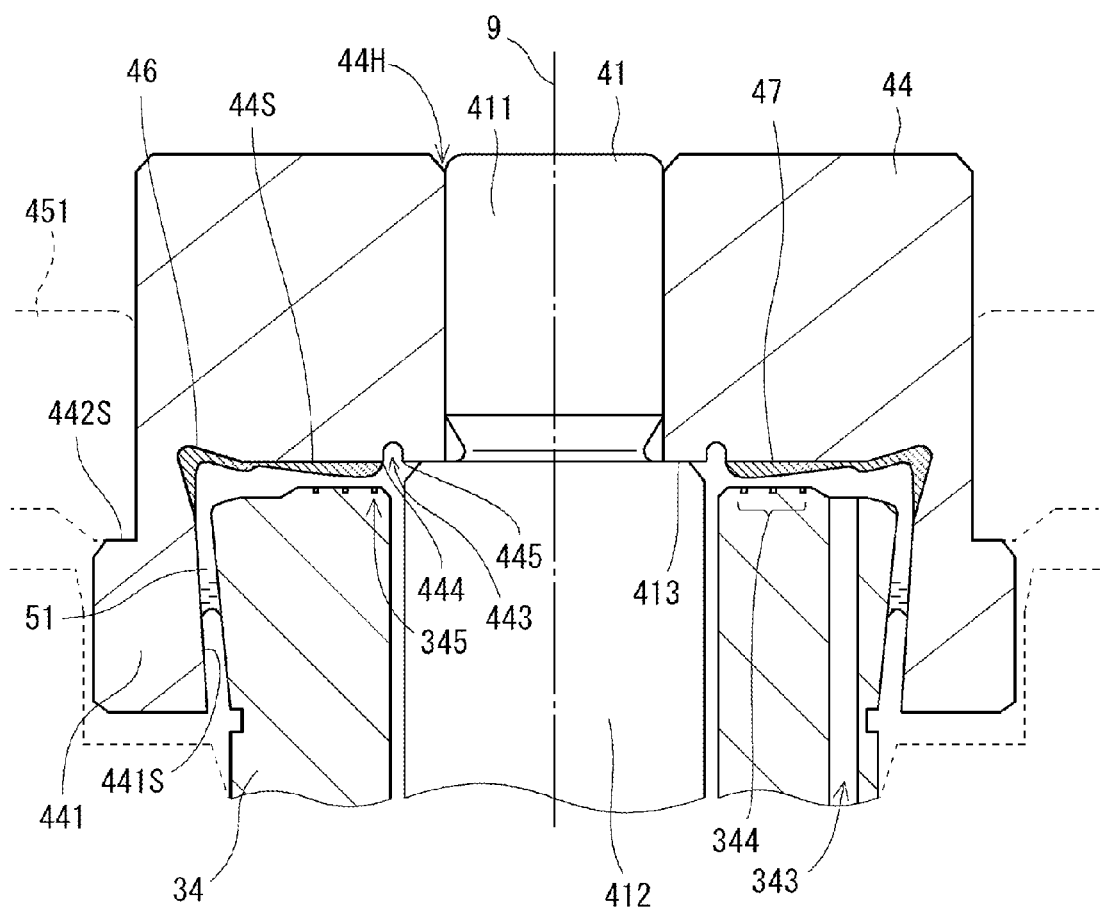
FIG. 8 is a sectional view taken along a plane including a center axis in the vicinity of a bushing.

FIG. 8 is a sectional view taken along a plane including the center axis in the vicinity of the bushing 44. The bushing 44 is fixed in such a condition that an inner peripheral portion of the under surface 44S is in contact with the stepped face 413. The bushing 44 includes an annular portion extending outwards in the radial direction from the shaft 41. The under surface 44S is opposed to the bearing face 344 of the top surface 34S of the sleeve 34. The bearing face 344, the under surface 44S, and the lubricating fluid 51 interposed between the faces constitute the thrust dynamic bearing mechanism.

The bushing 44 includes a cylindrical portion 441 extending downwards from an outer peripheral portion of the under surface 44S. The cylindrical inner circumferential surface 441S of the cylindrical portion 441 is formed continuously to the under surface 44S, and is opposed to the outer circumferential surface of the sleeve 34 via the lubricating fluid 51. On the outer circumferential surface of the cylindrical portion 441, a stepped face 442S which is in contact with the inner peripheral portion of the under surface of the disk holding portion 45 is disposed.

In the vicinity of a boundary portion between the under surface 44S and the cylindrical inner circumferential surface 441S, an outside annular concave portion 46 is disposed. The outside annular concave portion 46 is recessed on the axially upper side and on the radially outer side in the vicinity of the boundary portion between the under surface 44S and the cylindrical inner circumferential surface 441S.

On the inside of the under surface 44S, a substantially annular groove 443, which is defined by an axial recess in this preferred embodiment of the present invention, is disposed around the center axis 9. Edges with salient angles of the annular groove 443 constitute an edge 444 on the radially outer side and an edge 445 on the radially inner side. As shown in FIG. 8, the annular groove 443 is disposed in a region of the under surface 44S on the radially outer side than the portion which is in contact with the stepped face 413 of the shaft 41 and on the radially inner side than the portion which is opposed to the bearing face 344.

The edge 444 may be disposed in a position opposed to the radially inner-side end portion of the bearing face 344 in the axial direction. Specifically, "the region on the radially inner side than the portion which is opposed to the bearing face 344" includes the portion opposed to the radially inner-side end portion of the bearing face 344.

The edge 444 may be disposed in a region opposed to the bearing face 344. In this case, it is desired that the edge 445 on the inner peripheral side is positioned on the radially inner side than the end portion of the bearing face 344.

The under surface 44S is covered with the solid lubricating film 47 from the edge 444 to the cylindrical inner circumferential surface 441S of the outside annular concave portion 46. The solid lubricating film 47 is constituted by a solid material such as a resin with high lubricating property. For example, the solid lubricating film 47 is constituted by a single material or two or more combined materials selected from a group of molybdenum sulfide, tungsten sulfide, graphite, boron nitride, antimony trioxide, polytetrafluoroethylene (PTFE), mica, talc, and the like.

Due to the solid lubricating film 47, high sliding property between the bushing 44 and the sleeve 34 when the bushing 44 is started to rotate together with the shaft 41 can be attained. In addition, even when any shock is applied from the outside, the solid lubricating film 47 can reduce the damage caused by the contact between the top surface 34S and the under surface 44S.

Now referring back to FIG. 5, the disk holding portion 45 is fixed to the outer circumferential surface of the bushing 44. The disk holding portion 45 includes a flat plate portion 451 expanding outwards in the radial direction, a cylindrical portion 452 extending downwards from the outer peripheral portion of the flat plate portion 451, and a flange portion 453 extending radially outwards from the cylindrical portion 452.

An outer circumferential surface 452S of the cylindrical portion 452 includes a contact face which is in contact with the inner circumferential portion (the inner circumferential surface or the inner periphery) of the disk 14. A top surface 453A of the flange portion 453 includes a mounting face on which the disk 14 is mounted.

In this preferred embodiment, the hub 42 is constituted by two members, i.e., the bushing 44 and the disk holding portion 45. Alternatively, the hub 42 may be configured by a single member.

A rotor magnet 43 is disposed on an under surface of the disk holding portion 45. In addition, a yoke 431 is located on the under surface of the disk holding portion 45. The rotor magnet 43 is annularly placed so as to surround the center axis 9. An inner circumferential surface of the rotor magnet 43 is a pole face, and is opposed to the outer circumferential surface of the plurality of teeth portions 322.

As for the above-described spindle motor 2, when a driving current is applied to the coil 33 in the stationary portion 3, a magnetic flux in the radial direction is generated in the plurality of teeth portions 322. Then a torque is generated due to the action of the magnetic flux between the teeth portions 322 and the rotor magnet 43, so that the rotating portion 4 rotates around the center axis 9 with respect to the stationary portion 3. Accordingly, the two disks 14 and 14 supported on the hub 42 are rotated around the center axis 9.

Figure 9:
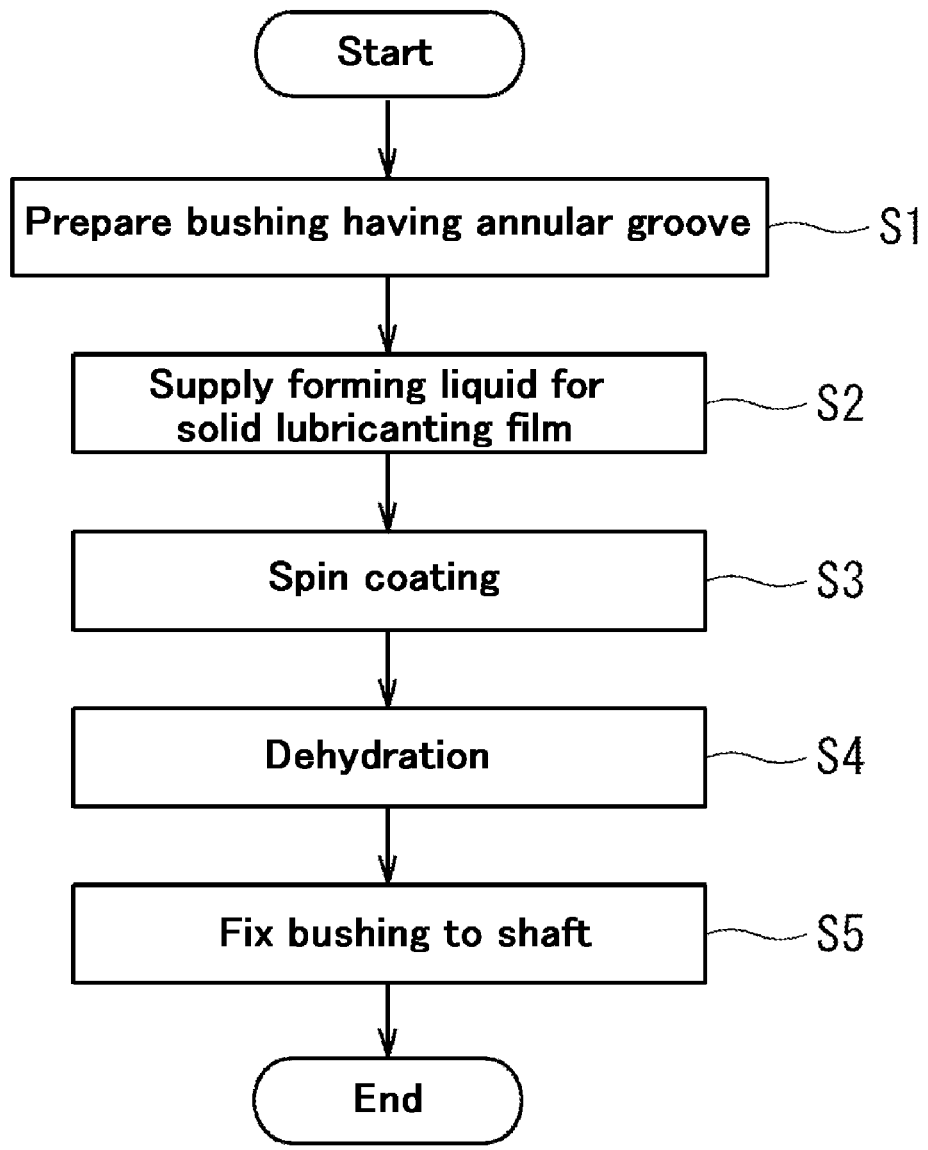
FIG. 9 is a flowchart illustrating part of a production procedure of a fluid dynamic bearing.
Figure 10A:
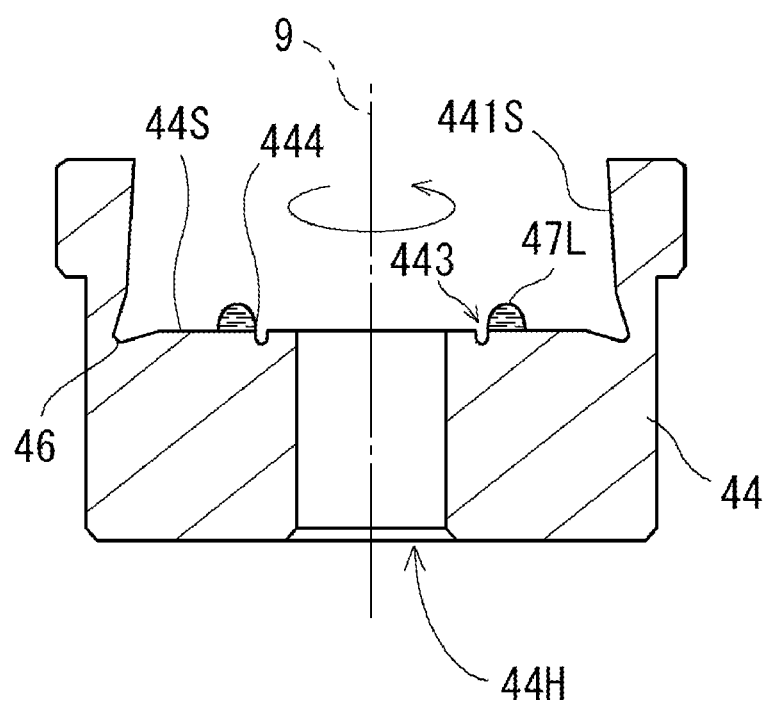
FIGS. 10A and 10B are views illustrating an application method of a forming liquid.
Figure 10B:
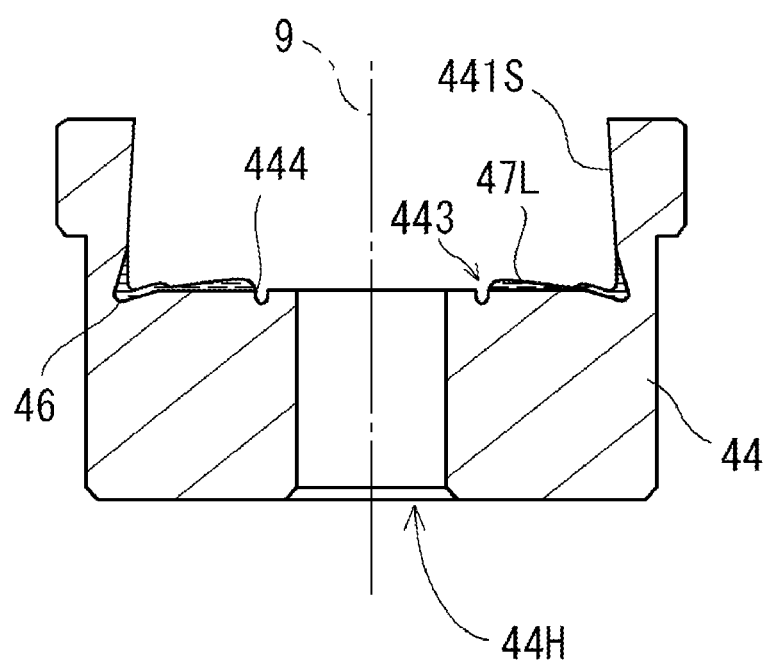

FIG. 9 is a flowchart illustrating apart of the production procedure of the fluid dynamic bearing according to the above-described preferred embodiments. FIGS. 10A and 10B are views showing a method for applying the forming liquid 47L. FIG. 10A is a view showing the condition where the forming liquid 47L is supplied to the bushing 44. FIG. 10B is a view showing the condition where the forming liquid 47L dropped on the bushing 44 is spread annularly.

When the fluid dynamic bearing is produced, first, a bushing 44 on which a solid lubricating film 47 is not formed yet is prepared (step S1). On the under surface 44S of the bushing 44, the above-mentioned annular groove 443 is arranged. The annular groove 443 is formed by cutting, for example.

After the bushing 44 is prepared, the solid lubricating film 47 is formed on the under surface 44S of the bushing 44 by a spin coating method. Specifically, as shown in FIG. 10A, in the condition where the under surface 44S is turned up, the forming liquid 47L is dropped onto the under surface 44S through a nozzle which is not shown (step S2). The forming liquid 47L is dropped so as to form a substantially annular shape in a portion on the radially and slightly outer side than edge 444 of the under surface 44S.

The consistency of the forming liquid 47L is preferably 400 to 1400 mPa·s, and more preferably 600 to 1200 mPa·s. The consistency of the forming liquid 47L is further more preferably 800 to 1000 mPa·s. In addition, the drop amount of the forming liquid 47L is appropriately determined in accordance with the area of the region to be applied and the thickness of the solid lubricating film 47 to be formed.

When the forming liquid 47L is dropped onto the under surface 44S, the bushing 44 is rotated around the center axis 9 at a predetermined rotational speed for a predetermined period of time. Accordingly, the centrifugal force acts on the forming liquid 47L, so that the forming liquid 47L is spread radially outwards (spin coating, step S3). For example, the bushing 44 is rotated at 33.3 to 66.7 revolutions/second (2000 to 4000 rpm) for about 3 to 7 seconds, so that the forming liquid 47L is spread over the under surface 44S (see FIG. 10B).

When the spin coating is finished, the forming liquid 47L is dehydrated and the solution is volatilized, thereby forming the solid lubricating film 47 on the under surface 44S (step S4). In this dehydration step, for example, after the bushing 44 is left at 55 to 65 degrees Celsius for 20 minutes or more (temporary dehydration), the bushing 44 is left at 180 to 200 degrees Celsius for one hour or more (full dehydration).

When the dehydration is completed, the head portion 411 of the shaft 41 is set in an insertion hole 44H of the bushing 44 (step S5). Specifically, the head portion 411 of the shaft 41 is fixed to the bushing 44 by press fitting or other means. At this time, a portion of the under surface 44S of the bushing 44 on the radially inner side than the annular groove 443 comes into contact with the stepped face 413 of the shaft 41. Accordingly, the bushing 44 is positioned with respect to the shaft 41.

The method for fixing the bushing 44 to the shaft 41 is not limited to the press fitting. For example, other fixing methods such as heat shrink fit, insertion, and the like may be adopted. In addition, when the bushing 44 is fixed to the shaft 41, the hub 42 may be configured in the condition where the bushing 44 is integrated with the disk holding portion 45.

In this preferred embodiment, the annular groove 443 is disposed on the under surface 44S of the bushing 44, so that the annular edge 444 is formed on the under surface 44S. When the forming liquid 47L is dropped on the radially outer side than the edge 444 of the under surface 44S, the surface tension acts on the edge 444, so that it is possible to prevent the solid lubricating film 47 from being formed on the radially inner side than the edge 444. As described above, by the provision of the edge 444, the solid lubricating film 47 can be formed in a desired area of the under surface 44S, and the bushing 44 can be positioned with respect to the shaft 41 with a high degree of accuracy.

The annular groove 443 is arranged on the under surface 44S of the bushing 44, so that even in the case where the forming liquid 47L unexpectedly comes into the radially inner side than the edge 444 of the under surface 44S when the forming liquid 47L is dropped on the radially outer side than the edge 444, the forming liquid 47L can be collected in the annular groove 443.

Since the outside annular concave portion 46 is recessed on the radially outside in the cylindrical inner circumferential surface 441S, it is possible to prevent the forming liquid 47L from being applied in such a condition that the forming liquid 47L is raised as compared with the cylindrical inner circumferential surface 441S. In addition, since the outside annular concave portion 46 is recessed on the axially upper side in the under surface 44S, it is possible to prevent the forming liquid 47L from being applied in such a condition that the forming liquid 47L is raised as compared with the under surface 44S.

The dimensions of the recesses of respective portions of the outside annular concave portion 46 are appropriately determined by measuring the thickness of the solid lubricating film 47 in respective portions after the spin coating is previously and experimentally performed. In this way, the outside annular concave portion 46 is provided in the vicinity of the boundary between the under surface 44S and the cylindrical inner circumferential surface 441S, so that it is possible to suppress the excessive raise of the solid lubricating film 47, and it is possible to form the solid lubricating film 47 with a smooth surface shape on the cylindrical inner circumferential surface 441S and the under surface 44S.

In this preferred embodiment, since the forming liquid 47L is applied by spin coating, a thinner solid lubricating film 47 can be formed as compared with a conventional applying method (for example, the average thickness is about 8 μm). Accordingly, the amount of the forming liquid 47L to be used can be reduced, and the time period required for dehydration can be shortened.

In this preferred embodiment, the edge 444 is arranged on the radially outer side than the portion of the under surface 44S which comes into contact with the stepped face 413 of the shaft 41, so that it is possible to prevent the solid lubricating film 47 from being formed in the portion which comes into contact with the stepped face 413. Accordingly, the shaft 41 can be fixed to the bushing 44 in a good condition.

In addition to the annular groove 443, a plurality of additional annular grooves may be formed on the radially inside of the annular groove 443. With such a configuration, many annular edges are configured around the center axis 9, so that it is possible to prevent the solid lubricating film 47 from being formed on the radially inner side than the annular groove 443. In the above-described preferred embodiment, the edge 444 is configured by the provision of the annular groove 443 in the under surface 44S of the bushing 44, but the configuration of the edge is not limited to this. In the following description, elements having the same functions as those in the above-described preferred embodiment are designated by the same reference numerals, and the descriptions thereof are omitted.

Figure 11:
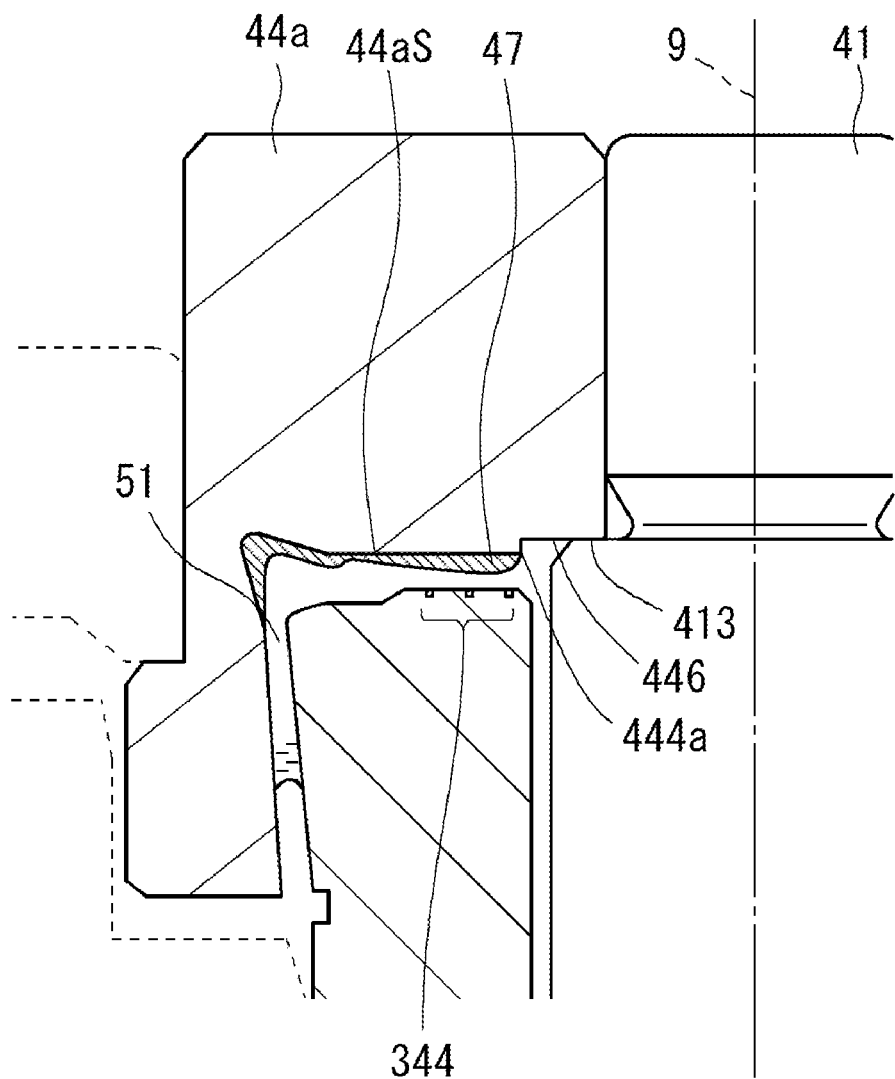
FIG. 11 is a sectional view taken along a plane including a center axis in the vicinity of a bushing.

FIG. 11 is a sectional view taken along a plane including the center axis in the vicinity of a bushing 44a. An under surface 44aS of the bushing 44a includes an annular concave portion 446 in which a non-covered region with a solid lubricating film 47 is recessed on the upper side as compared with a covered region. An under surface of the annular concave portion 446 comes into contact with a stepped face 413 of the shaft 41, thereby positioning the bushing 44a to the shaft 41.

In the bushing 44a, a radially outer end portion (a portion protruding downwards) of the annular concave portion 446 constitutes an annular edge 444a surrounding the center axis 9. Since the edge 444a is disposed on the radially inner side of the region in which the solid lubricating film 47 is to be formed, it is possible to prevent the forming liquid 47L from coming in the inside thereof, it is possible to form the solid lubricating film 48 in a desired region, and it is possible to position the bushing 44a to the shaft 41 with a high degree of accuracy.

Figure 12:
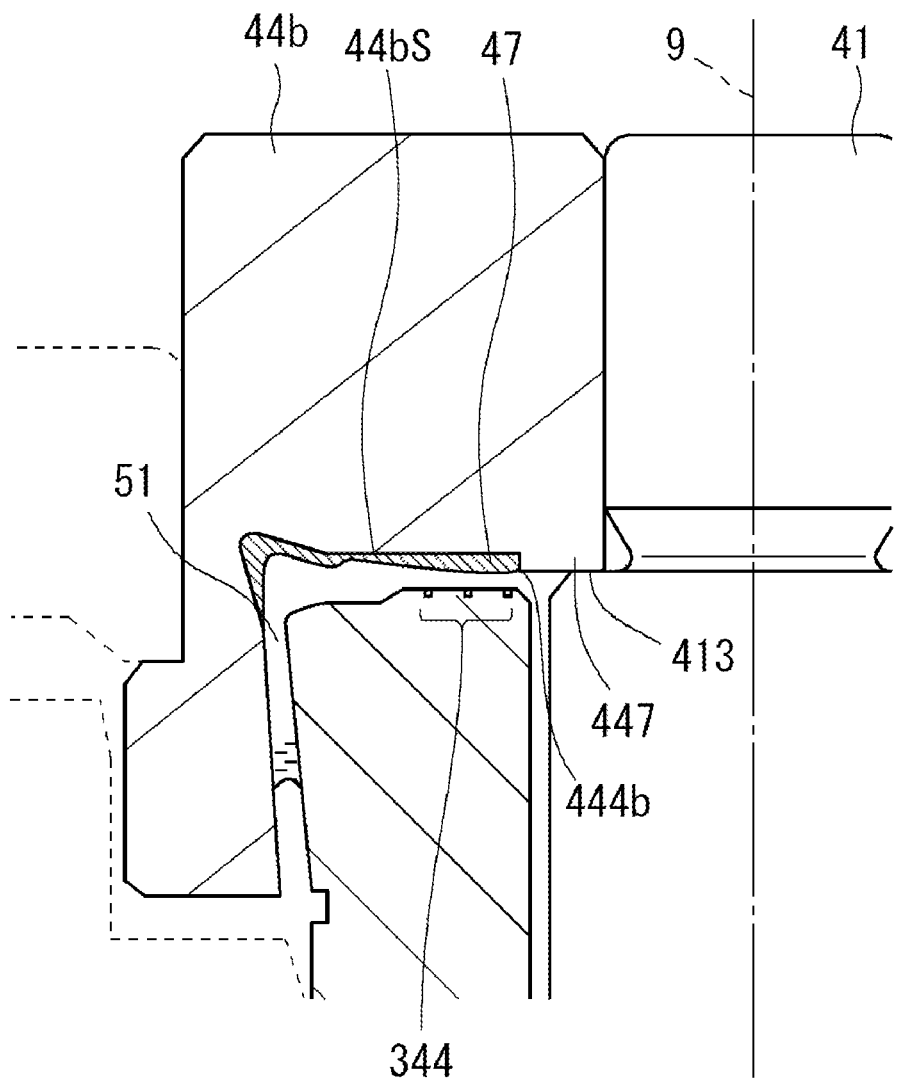
FIG. 12 is a sectional view taken along a plane including a center axis in the vicinity of a bushing.

FIG. 12 is a sectional view taken along a plane including the center axis in the vicinity of a bushing 44b. An under surface 44bS of the bushing 44b includes an annular convex portion 447 in which a non-covered region with the solid lubricating film 47 protrudes downwards as compared with a covered region. An under surface of the annular convex portion 447 comes into contact with a stepped face 413 of the shaft 41, thereby positioning the bushing 44b to the shaft 41.

In the bushing 44b, an edge of the radially outside end portion of the annular convex portion 447 (i.e., a portion recessed on the lower side) constitutes an annular edge 444b surrounding the shaft 41. In this way, the edge 444b is disposed on the radially inner side of the region in which the solid lubricating film 47 is to be formed, so that it is possible to prevent the forming liquid 47b from coming into the inside thereof, it is possible to form the solid lubricating film 47 in a desired region, and it is possible to position the bushing 44b to the shaft 41 with a high degree of accuracy.

Figure 13:
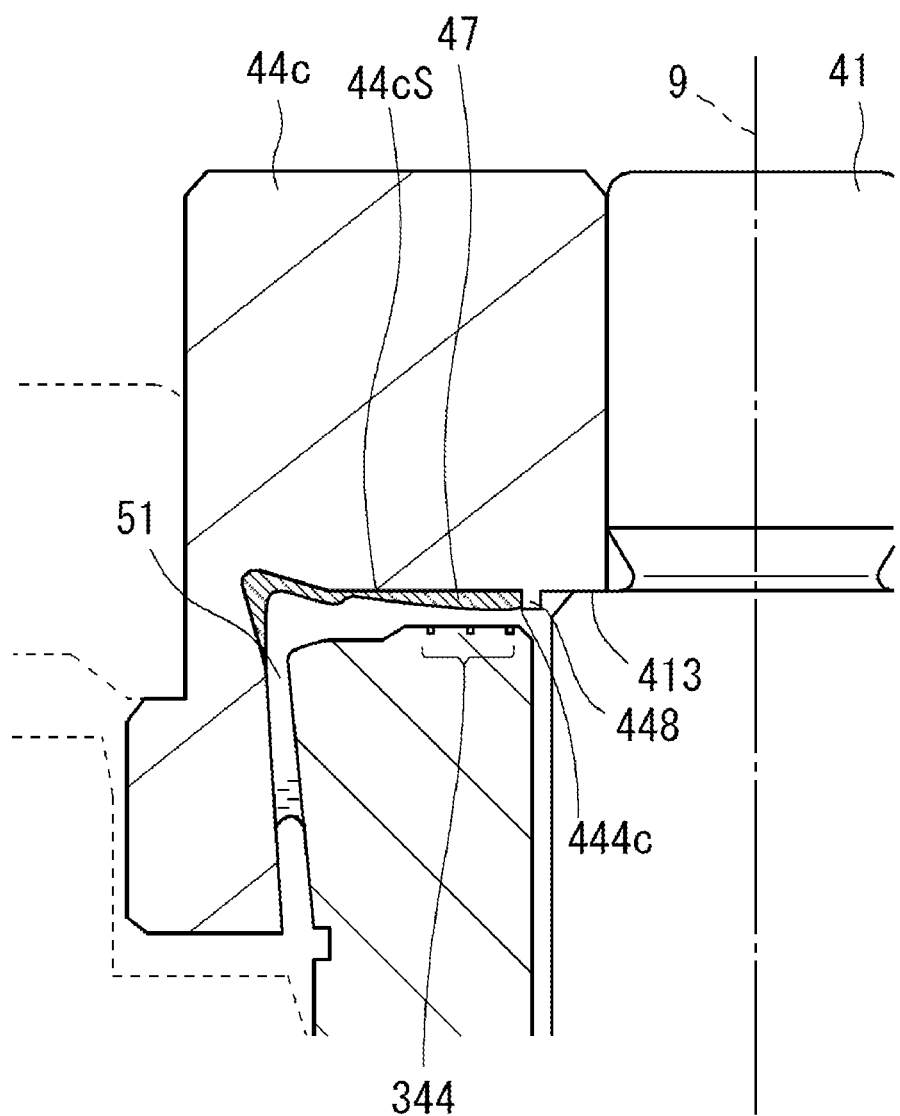
FIG. 13 is a sectional view taken along a plane including a center axis in the vicinity of a bushing.

FIG. 13 is a sectional view taken along a plane including the center axis in the vicinity of a bushing 44c. On an under surface 44cS of the bushing 44c, an annular protruding portion 448 protruding on the lower side and surrounding the shaft 41 is disposed. The solid lubricating film 47 is formed on the radially outer side than the annular protruding portion 448.

In the bushing 44c, a salient angle on the radially outside of the annular protruding portion 448 constitutes an annular edge 444c surrounding the shaft 41. In this way, the edge 444c is disposed on the radially inner side of the region in which the solid lubricating film 47 is to be formed, so that it is possible to prevent the forming liquid 47 from coming into the inside thereof, it is possible to form the solid lubricating film 47 in a desired region, and it is possible to position the bushing 44c to the shaft 41 with a high degree of accuracy.

The exemplary preferred embodiments of the present invention are described above, but the present invention is not limited to the above-described preferred embodiments.

Figure 14:
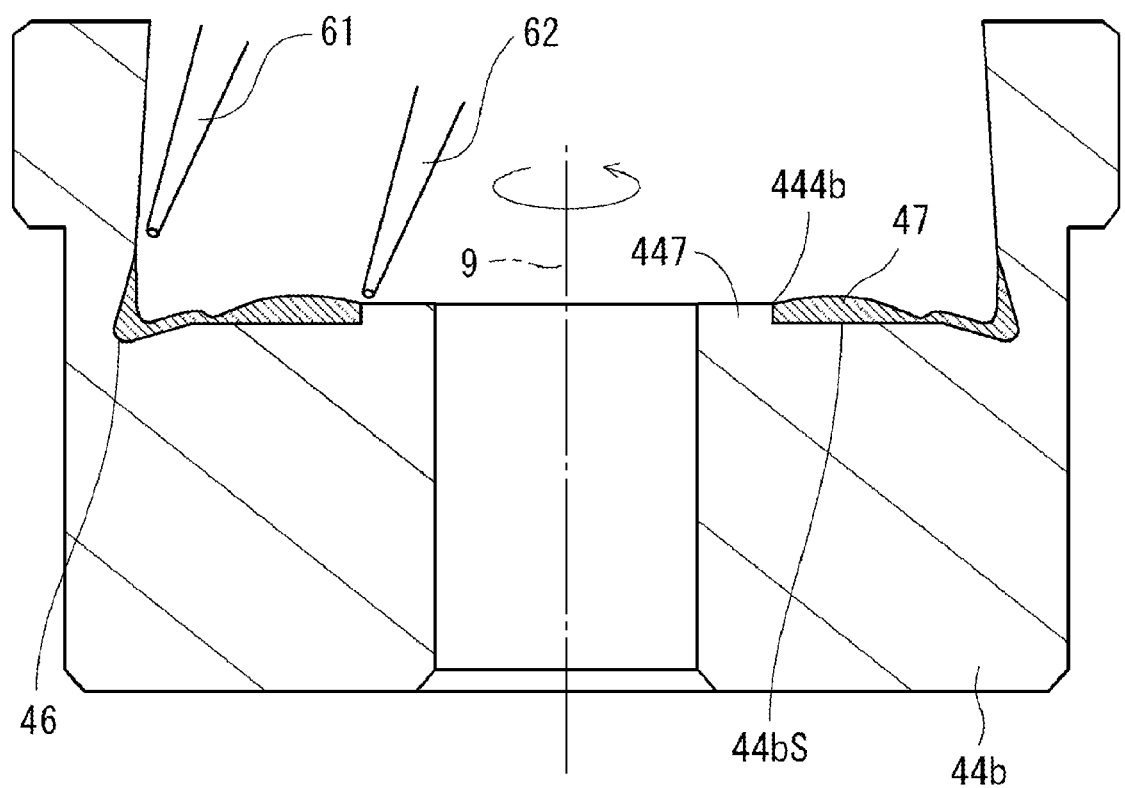
FIG. 14 is a view illustrating an application method of a forming liquid.

For example, as shown in FIG. 14, suction devices 61 and 62 for sucking the atmosphere are provided in the vicinity of the upper portion of the outside annular concave portion 46, and in the vicinity of the edge 444b. While the neighboring atmosphere is sucked by the suction devices 61 and 62, the step of spin coating (step S3) may be executed. The positions to be provided, the vigor of the suction, the amount of suction, and the like of the suction devices 61 and 62 are adjusted, so that the forming region of the solid lubricating film 47 can be regulated with a high degree of accuracy.

Figure 15:
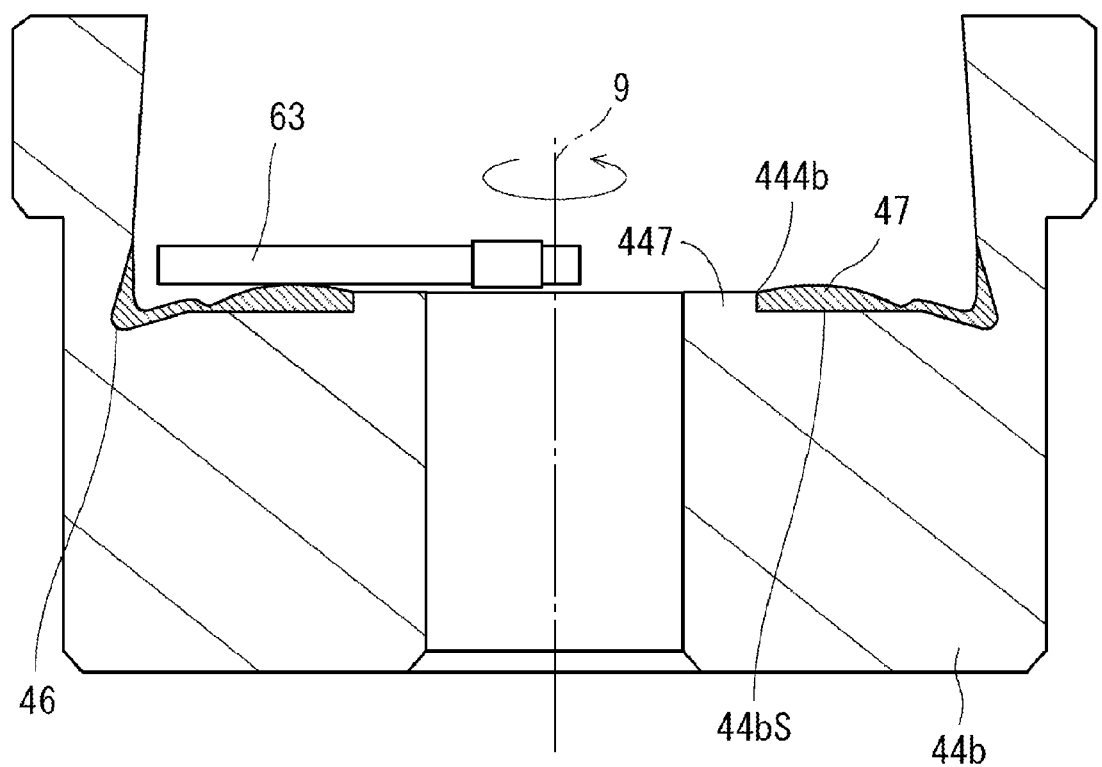
FIG. 15 is a view illustrating an application method of a forming liquid.

In addition, as shown in FIG. 15, a rod 63 which uniformly extends just above the under surface 44bS of the bushing 44b is provided. During the step of spin coating, the bushing 44b may be rotated in the condition that the rod 63 abuts against the liquid level of the forming liquid 47L. By adjusting the position and the like of the rod 63, the forming liquid 47L can be spread out while the surface of the forming liquid 47L can be evenly regularized.

In the above-described embodiments, the edge is continuously annular. However, the shape of the edge is not limited to this. For example, the edge may be intermittently configured. The shape of the edge is not limited to a circle. The edge of various shapes can be adopted (e.g., an ellipse, a polygon, and the like).

In the preferred embodiments shown in FIGS. 8, 11 to 13, the solid lubricating film is formed by arranging the annular edge in the bushing, and the bearing face is formed on the sleeve opposed to the film. The configuration is not limited to this. For example, an annular edge may be formed on the side of the sleeve, thereby forming a solid lubricating film on the side of the sleeve, and a bearing face is disposed on the bushing opposed to the solid lubricating film (see FIG. 3).

In the above-described embodiments, the case where the forming liquid is spread out by spin coating. However, the method is not limited to the spin coating. For example, the forming liquid may be spread out without rotating the bushing, thereby forming the solid lubricating film, and then the solid lubricating film may be shaped by cutting so as to have a desired shape.

The present invention can be applied to a dynamic bearing for rotating an optical disk or the like other than a magnetic disk. It is noted that the dynamic bearing for the magnetic disk is required to have especially high performances for the rotational characteristics. Accordingly, the technical significance attained by applying the present invention to the dynamic bearing for a magnetic disk is great.

The respective elements described in the above-described preferred embodiments and modified embodiments can be appropriately combined unless the combination causes any contradiction.

The present invention can be applied to a production method of a fluid dynamic bearing, a fluid dynamic bearing, a spindle motor, and a disk driving apparatus.

The present invention can be applied to a shaft fixed motor in which a sleeve is rotated with respect to a shaft.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A fluid dynamic bearing comprising:
a shaft arranged along a center axis extending axially;
an annular portion expanding radially outwards from the shaft;
a sleeve including a top surface opposed to an under surface of the annular portion, the sleeve arranged to support the shaft and the annular portion in a relatively rotatable manner; and
a lubricating fluid interposed between the shaft, the annular portion, and the sleeve, wherein
the under surface includes a substantially annular edge surrounding the center axis, the substantially annular edge being radially spaced away from the shaft and the substantially annular edge being arranged radially outward from and adjacent to an axial recess defined in the under surface,
a region of the under surface radially outward from the substantially annular edge is covered with a solid lubricating film, and
the substantially annular edge is an edge of the axial recess, the axial recess is a substantially annular groove including sidewalls and surrounding the center axis disposed on the under surface.

2. A fluid dynamic bearing according to claim 1, wherein the annular portion includes a cylindrical surface extending axially downwards from the under surface, and a radially outside annular concave portion located where the under surface and the cylindrical surface intersect, the radially outside annular concave portion being recessed on an axially upper side and on a radial outer side, and the region covered with the solid lubricating film reaches a radial inside of the radially outside annular concave portion.

3. A fluid dynamic bearing according to claim 1, wherein on the top surface, a bearing face including dynamic pressure grooves arranged to induce fluid dynamic pressure in the lubricating fluid interposed between the top surface and the under surface is arranged, and the substantially annular edge is disposed in a region radially inward from a portion of the annular portion opposed to the bearing face.

4. A fluid dynamic bearing according to claim 1, wherein the region covered with the solid lubricating film reaches the substantially annular edge.

5. A spindle motor comprising:
a base member;
a stationary portion fixed to the base member;

a rotating portion supported rotatably with respect to the base member by a fluid dynamic bearing recited in claim 1; and a rotor magnet fixed to the rotating portion and opposed to the stationary portion.

6. A disk driving apparatus provided with a disk comprising:

the spindle motor recited in claim 5;

an access unit arranged to read and/or write information from and/or to the disk; and a housing arranged to accommodate the spindle motor and the access unit on the inside thereof.

\* \* \* \* \*